United States Patent [19]

Kubo

[11] 3,818,230
[45] June 18, 1974

[54] BRIDGE DEVICE FOR MEASURING THE INFRARED RADIATION
[75] Inventor: Moritada Kubo, Tokyo, Japan
[73] Assignee: Tokyo Shibaura Electric Company, Ltd., Kanagawa-ken, Japan
[22] Filed: Jan. 2, 1973
[21] Appl. No.: 320,551

Related U.S. Application Data
[63] Continuation-in-part of Ser. No. 96,730, Dec. 10, 1970, abandoned.

[30] Foreign Application Priority Data
Dec. 13, 1969   Japan.............................. 44-99846

[52] U.S. Cl.................. 250/338, 250/210, 250/340
[51] Int. Cl............................................. H01j 39/12
[58] Field of Search...................... 250/210, 338, 340

[56] References Cited
UNITED STATES PATENTS
| | | | |
|---|---|---|---|
| 3,014,135 | 12/1961 | Hewlett et al. ...................... | 250/210 |
| 3,089,034 | 5/1963 | Meade ............................... | 250/338 |
| 3,094,617 | 6/1963 | Humphries.......................... | 250/210 |
| 3,214,593 | 10/1965 | Killpatrick .......................... | 250/210 |
| 3,340,400 | 9/1967 | Quittner.............................. | 250/210 |

Primary Examiner—James W. Lawrence
Assistant Examiner—Harold A. Dixon
Attorney, Agent, or Firm—Oblon, Fisher, Spivak, McClelland & Maier

[57] ABSTRACT

A bridge device for measuring infrared radiation comprises a pair of branches, one of which serially includes a thermistor bolometer and a D.C. voltage source, and the other of which serially includes a resistor and a D.C. voltage source. The thermistor bolometer is located so as to be illuminated by the radiation of the infrared rays being measured as the same are passed through an opening of a rotary sector. Means are provided for periodically applying high voltage pulses respectively to the branches of the bridge circuit in order to momentarily increase the voltage levels of the D.C. voltage sources during the period that the radiation from the incident infrared rays being measured falls on the thermistor bolometer. A synchronous rectifier, which operates in a synchronized relation with the aforesaid pulses, is provided for producing an unbalanced voltage between the branches of the bridge, the same being an indication of the infrared rays being measured.

3 Claims, 9 Drawing Figures

3,818,230

FIG. 1B  RESISTANCE OF THERMISTOR BOLOMETER

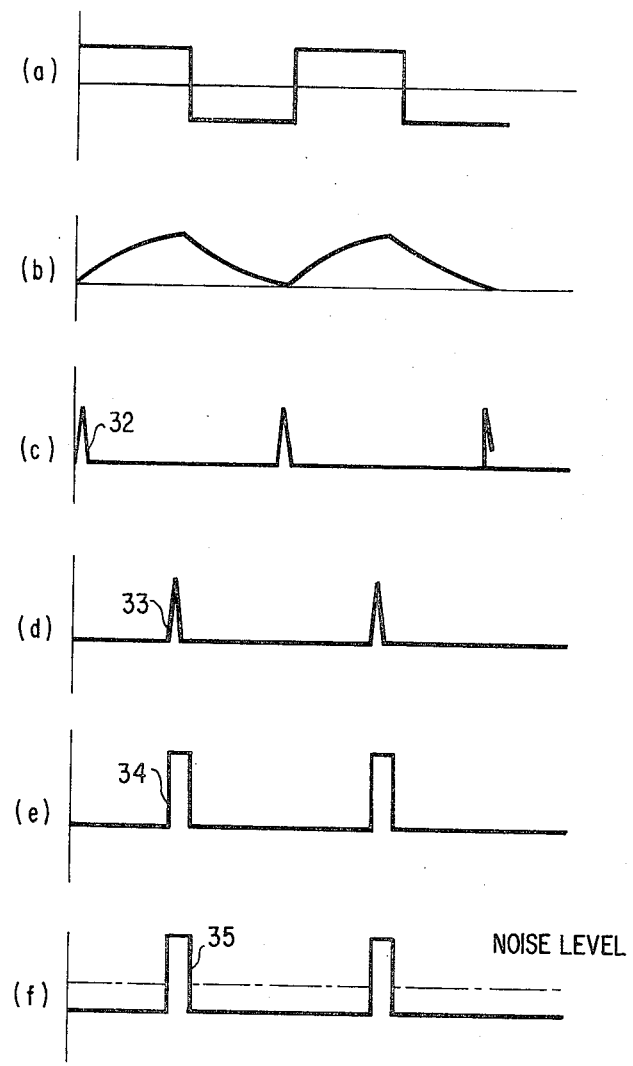

BRIDGE DEVICE FOR MEASURING THE INFRARED RADIATION

CROSS-REFERENCE TO RELATED APPLICATION

This application is a Continuation-In-Part of copending application Ser. No. 96,730, filed Dec. 10, 1970, now abandoned.

BACKGROUND OF THE INVENTION

1. Field Of The Invention

The present invention relates to a bridge device for rapidly measuring infrared radiation with a high signal-to-noise ratio.

2. Description Of The Prior Art

In the past, bridge devices have been used for measuring infrared radiation and the same generally include a thermistor bolometer for receiving the radiation of the infrared rays being measured. The infrared rays are intermittently received by the thermistor bolometer through a rotary section, and an A.C. output signal is produced by the bridge device in accordance with the intensity of the infrared rays.

Under certain conditions, it is desirable for a bridge device such as described above to perform with a rapid response. Thus, for example, when the aforesaid bridge device is employed as an infrared thermometer and mounted upon a weather observation satellite, and since the satellite will move in space with a fairly high speed, the intensity of infrared rays detected by the thermistor bolometer may rapidly vary. As a result thereof, in order to enable the bridge device to rapidly respond to the variations of the infrared rays, it has been found necessary to increase the chopping frequency of the infrared rays by increasing the rotational speed of the rotary sector.

As shown in FIG. 1a, however, when the rotational speed of the rotary sector has increased, the open time periods of the sector will be shortened from, for example, a waveform 10 (shown by dotted lines) to a waveform 11 (shown by solid lines). It was found that during the shortened open period wherein the infrared rays would be allowed to fall upon the thermistor bolometer through the rotary sector that the corresponding variations of resistance of the thermistor bolometer, as shown in FIG. 1b, would change, for example, from a curve 12 (shown by dotted lines) to a curve 13 (shown by solid lines).

Thus, it is seen that when a rapid response performance of the bridge device is intended that the resistance variation of the thermistor bolometer will become small and as a result thereof, the signal-to-noise ratio (s/n ratio), in the bridge device will become lower.

SUMMARY OF THE INVENTION

Accordingly, it is an object of this invention to provide a new and improved unique bridge device for measuring the radiation of infrared rays which is capable of operating under rapid response conditions with a higher signal-to-noise ratio than heretofore possible.

Another object of this invention is to provide a new and improved unique bridge device for measuring the radiation of infrared rays, wherein a higher signal-to-noise ratio, as well as a rapid responsive performance, can be simultaneously achieved without any damage to a thermistor bolometer being used in the bridge.

Briefly, in accordance with one embodiment of this invention, these and other objects are, in one aspect, attained by the provision of a bridge circuit which includes a pair of branches, one of which serially includes a thermistor bolometer, a first D.C. voltage source and a first diode gate means, and the other of which serially includes a resistor, a second D.C. voltage source and a second diode gate means. The first and second D.C. voltage sources are connected in series so that their respective voltages will add in the bridge circuit and be applied across the thermistor bolometer and the resistor which are connected in series thereto. The thermistor bolometer is located at a position to receive the chopped infrared rays coming through a rotary sector for measurement of the intensity thereof. A timing pulse generator is coupled with the rotary sector so that timing pulses will be sequentially obtained therefrom in synchronization with the opening of the notches of the sector. A time-delay circuit is provided for shifting the timing signal to a point at which the resistance variation of the thermistor bolometer is substantially the largest. A high voltage pulse generator, which is excited by the timing pulse generator, is provided and the output pulses therefrom are applied to the first and second diode gate means so that the output pulses will be added to the voltages provided by the D.C. voltage sources in the bridge. A synchronous rectifier, which performs its rectifying operation in a synchronized relation with the operation of the high voltage pulse generator, is provided for producing an unbalanced output voltage between the pair of branches of the bridge circuit to provide an indication of the intensity of the infrared rays being measured.

BRIEF DESCRIPTION OF THE DRAWINGS

The present invention will be more fully understood from the following description when taken in connection with reference to the accompanying Drawings, wherein:

FIG. 1b is a diagram of a curve which illustrates the resistance variation of a thermistor bolometer;

DETAILED DESCRIPTION OF THE PREFERRED EMBODIMENTS

Figure 2:
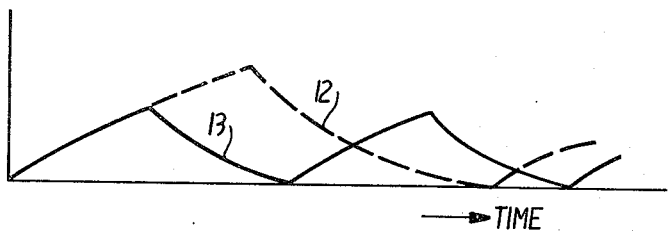
FIG. 2 is a circuit diagram of one preferred embodiment according to the instant invention; and, FIGS. 3a to 3f are waveforms illustrating the operation of the bridge device of FIG. 2.
Figure 2:
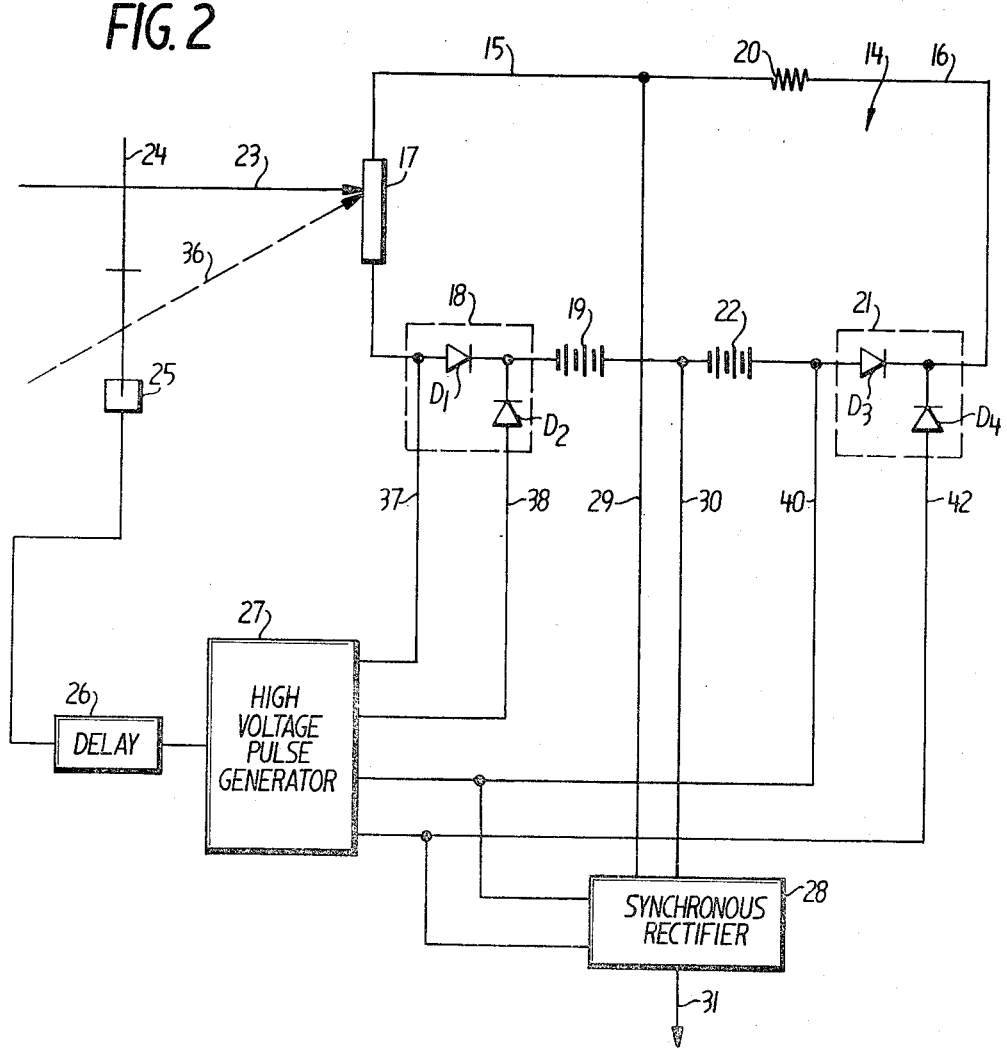

Referring now to the Drawings, wherein like reference numerals designate identical, or corresponding parts throughout the several views, and more particularly to FIG. 2 thereof, a bridge circuit is generally shown with a reference numeral 14, and includes a pair of branches 15 and 16. The branch 15 serially includes a thermistor bolometer 17, a first diode gate means 18 including a pair of diodes $D_1$ and $D_2$, and a first D.C. voltage source 19. The other branch 16 serially includes a resistor 20, a second diode gate means 21 including a pair of diodes $D_3$ and $D_4$, and a second D.C. voltage source 22. The first and second D.C. voltage sources 19 and 22 are connected in series so that the voltages thereof will be added and applied across the serially connected thermistor bolometer 17 and resistor 20.

Infrared rays 23, the intensity of which are to be measured are intermittently passed to the thermistor bolometer 17 through a conventional rotary sector 24 which is rotated by an electrical motor, not shown.

A synchronized signal generator 25, which may be a conventional photoelectric or electromagnetic transducer or the like, is provided adjacent to the peripheral portion of the sector 24 for generating sequential electrical signals in synchronization with the initial passing of the infrared rays 23 through the sector.

The signals generated from the signal generator 25 are applied to a delay circuit 26, the same provides output signals therefrom which are delayed from the input signals by a predetermined time interval. The output signals of the delay circuit 26 are then applied to a high voltage pulse generator 27, whereby the same is triggered to generate high voltage pulses therefrom.

The high voltage pulses generated from the pulse generator 27 are applied to both inputs 37 and 38 of the diode gate means 18, and to both inputs 40 and 42 of the diode gate means 21. The high voltage pulses are then respectively applied to the D.C. voltage sources 19 and 22 for momentarily raising the amplitude of the source voltages of bridge 14. It should be understood that under such conditions the sensitivity of bridge 14 is momentarily raised.

In order to obtain unbalanced output voltages from the bridge circuit 14, a synchronous rectifier 28 is provided and the operation of the same is controlled by the high voltage pulses obtained from the high voltage pulse generator 27. The synchronous rectifier 28 includes a pair of input terminals 29 and 30 which are respectively connected to an intermediate connecting point between the thermistor bolometer 17 and resistor 20, and to an intermediate connecting point between the D.C. voltage sources 19 and 22. It should be understood that the output terminal 31 of the synchronous rectifier 28 is connected to a suitable measuring device (not shown).

The operation of the device disclosed in FIG. 2 will be now described by referring to FIG. 3. It should be understood that the bridge 14 will remain in a balanced state when no infrared rays fall upon the thermistor bolometer 17 such that the same will not generate an out put therefrom.

Figure 1A:
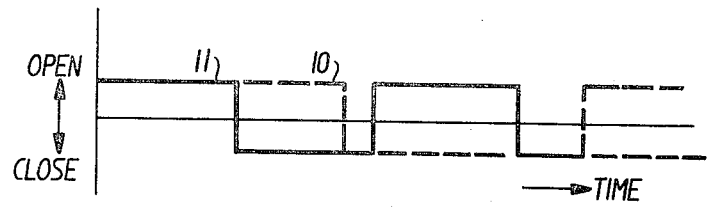
FIG. 1a is a timing diagram illustrating the open and closed states of a rotary sector.

FIGS. 3a and 3b show waveforms similar to those of FIGS. 1a and 1b. As shown in FIG. 3a, as soon as a notch of the sector 24 opens, the infrared rays under measurement will be allowed to pass therethrough and a synchronized signal or pulse 32, as shown in FIG. 3c, will be simultaneously generated by the signal generator 25. The pulse or signal 32 is then delayed by passing the same through the delay circuit 26 until the largest amplitude of resistance variation of the thermistor bolometer 17 is reached as shown by the pulse 33 in FIG. 3d.

The pulse or signal 33 from the delay circuit 26 will then excite the high voltage pulse generator 27 so as to provide a higher voltage pulse 34 therefrom, as shown in FIG. 3e. The pulses 34 are then added to to the voltages provided by the D.C. voltage sources 19 and 22 through respective diode gate means 18 and 21 so that the amplitude of the source voltage of the bridge is momentarily increased. More particularly, the diodes $D_1$ and $D_3$ are connected in series with D.C. voltage sources 19 and 22, respectively, and diodes $D_2$ and $D_4$ are employed to add the high voltage pulses 34 from the high voltage pulse generator 27 to the D.C. source voltages across the dioes $D_1$ and $D_3$. At the same time, the synchronous rectifier 28 will receive the high voltage pulses from the pulse generator 27, and provide the rectified output pulse 35, as shown in FIG. 3f, in response to the unbalanced condition of the bridge 14.

From the above, it is apparent that in accordance with the present invention, since the D.C. source voltage of the bridge will momentarily rise just at the point in time when the infrared radiation detected by the thermistor bolometer 17 becomes substantially the largest, namely, when the largest resistance variation of the thermistor bolometer 17 is substantially reached, that the sensitivity of the unbalanced bridge device will greatly increase. In accordance with the above teachings, it is no longer necessary to employ D.C. voltage sources 19 and 22 having higher voltages to compensate for the lower resistance variation of the thermistor bolometer 17, when a higher chopping frequency of the rotary sector 24 is taken for measuring the infrared radiation. Moreover, with the elimination of the need for higher voltage sources, the possibility of burning-out the thermistor bolometer 17 is generally eliminated. Of course, it should be understood that the mean value of the high voltage pulse 34 of FIG. 3e, which is added to the voltages provided by the D.C. voltage sources 19 and 22, is selected to a small enough amplitude so that burn-out of the thermistor bolometer 17 will not occur. In view of the above, a bridge device is provided for measuring infrared radiation, which performs with a high signal-to-noise ratio and quick response.

Obviously, the numerous modifications and variations of the present invention are possible in light of the above teachings. For example, reference rays 36, as shown by the dotted lines in FIG. 2, can be employed for making relative measurements. In such an application, both of the rays 23 and 36 could be alternately detected by the thermistor bolometer 17 in a conventional manner, and it will be easily understood that a measuring procedure similar to that described above will be taken. It should be understood that the present invention could also be used as a conventional pyrometer and the like. It is therefore to be understood that within the scope of the appended Claims, the invention may be practiced otherwise than as specifically described herein.

What is claimed as new and desired to be secured by letters patent of the United States is:

1. A bridge device for measuring infrared radiation comprising:

a bridge circuit normally being in a balanced condition and having at least a pair of branches, one of which includes an infrared radiation responsive device therein;

means for selectively allowing infrared radiation to be measured to fall upon said infrared radiation responsive device to thereby unbalance said bridge circuit;

means connected to said bridge circuit for momentarily increasing the sensitivity of said bridge circuit only at the instant of time of measurement of said infrared radiation whereby measurements may be made rapidly with a high signal-to-noise ratio, said means for momentarily increasing the sensitivity of said bridge circuit including a high voltage pulse generator and a pair of diode gates for gating the output of said generator to the branches of said bridge; and synchronizing means coupled between said means for selectively allowing infrared radiation to be measured to fall upon said radiation responsive device and said means for momentarily increasing the sensitivity of said bridge for synchronizing the intervals at which infrared radiation falls on said infrared responsive device with intervals at which the sensitivity of said bridge is increased.

2. A bridge device for measuring infrared radiation comprising:

a bridge circuit having a pair of branches, one of which serially includes therein a thermistor bolometer, a first diode gate means and a first D.C. voltage source and the other of which serially includes therein a resistance device, a second diode gate means, and a second D.C. voltage source, said thermistor bolometer being arranged to periodically detect chopped infrared rays, the radiation thereof of which is to be measured;

a synchronized signal generator for generating sequential electrical pulses in response to the chopped frequency of said infrared rays;

a time-delay circuit provided for responding to the output signals of said synchronized signal generator and for delaying said signals to a time at which the largest resistance variations of said thermistor bolometer are substantially reached;

a high voltage pulse generator to generate an output of high voltage pulses in response to the output of said time-delay circuit, said output of said pulse generator being applied to inputs of each of said diode gate means so as to add the output voltage pulses of said pulse generator to the voltages of said D.C. voltage sources at the point in time when the largest resistance variations of said thermistor bolometer is reached, and, a synchronous rectifier connected to said high voltage pulse generator and to the output of said bridge circuit for detecting an unbalanced condition therefrom indicative of the infrared rays being measured.

3. A bridge device for measuring infrared radiation according to claim 2, wherein:

said voltage pulse generator is arranged such that the mean value of the high voltage pulses generated therefrom is selected so as to be added to the voltages of said D.C. voltage sources without causing burn-out of said thermistor bolometer.

* * * * *